United States Patent [19]
Trema

[11] Patent Number: 4,877,097
[45] Date of Patent: Oct. 31, 1989

[54] SUPPORT AND SUSPENSION ARM FOR A DRIVING WHEEL

[75] Inventor: Daniel Trema, Bezons, France

[73] Assignee: Elf France, Courbevoie, France

[21] Appl. No.: 190,956

[22] Filed: May 5, 1988

[30] Foreign Application Priority Data

May 15, 1987 [FR] France ............................ 87 06824

[51] Int. Cl.⁴ ...................... B62K 21/00; B62K 25/00
[52] U.S. Cl. .................................. 180/357; 180/219; 280/267
[58] Field of Search ................ 180/72, 219, 220; 280/267, 269, 270

[56] References Cited

U.S. PATENT DOCUMENTS

| 3,349,931 | 10/1967 | Wagner | 180/72 |
| 3,584,699 | 6/1971 | Urick | 180/72 |
| 4,526,249 | 7/1985 | Parker | 180/219 |
| 4,553,622 | 11/1985 | De Cortanze | 180/72 |
| 4,650,021 | 3/1987 | Matsuda et al. | 180/219 |
| 4,650,022 | 3/1987 | Sato et al. | 180/219 |
| 4,650,023 | 3/1987 | Matsuda et al. | 180/219 |

FOREIGN PATENT DOCUMENTS 0291369 4/1988 European Pat. Off. .
555975 9/1943 United Kingdom .

Primary Examiner—Richard A. Bertsch
Attorney, Agent, or Firm—Burgess, Ryan & Wayne

[57] ABSTRACT

The driving wheel of a vehicle is mounted on one side of an arm and is connected at least in rotation to the other side of the arm having a endless wheel, the arm having, prior to the connection with the arm part disposed transversally, a section of which the outer casing is crossed through by at least one of the two chain strands in a chain channel the walls of which cooperate in increasing the inertia of the arm section, and being applied to a rear arm of a chain driven motorcycle.

8 Claims, 1 Drawing Sheet

SUPPORT AND SUSPENSION ARM FOR A DRIVING WHEEL

The present invention concerns an arm for the support and suspension of a driving wheel of a vehicle mounted on one side of the arm and connected at least in rotation on the other side of the arm to a driving endless chain, the said arm being pivoted on the body and especially on the chassis of the vehicle by an arm part which is disposed transversally to the direction of displacement of the vehicle and is connected by at least two rotary bearings to this chassis.

Such support arms which were first derived from current automotive productions, have started to be used on motorcycles in order to support the rear driving wheel of such vehicles. A first advantageous adaptation to the motorcycle consisted in disposing the rear wheel and the brake disc on one side of the arm while the crown or chain sprocket wheel was placed on the other side of the arm which allowed rapid removal of the wheel and, where necessary, of the brake disk without having to modify the chain adjustment.

In order to produce motorcycles adapted to high speeds which have already exceeded 300 km/h on speed circuits, it is necessary to reduce the running speed of the chain and thus the diameter of the sprocket wheel or crown receiving the chain and integral in rotation with the wheel. The reduction of the diameter of the chain receiving sprocket wheel results in a correlative increase in the forces exerted on the chain which thus provoke exaggerated compression, buckling, flexing and torsion forces on the wheel support arm. By way of example, the latest models of speed motorcycles having a single arm have shown compression forces on the arm reaching 2,200 daN. Such forces require that the arm by made in the form of a very resistant caisson beam.

One of the aims of the present invention is specifically to enable to increase considerably the inertia of the section of the arm cross-section in the zone where said arm is subjected to maximal forces without substantially increasing the quantity of material used for this arm and thus the weight and the cost of the arm.

With this aim, the driving wheel support arm has in the zone subjected to the maximal flexing moment beyond the connection with the transverse part of the arm, an outer casing of the arm cross-section through which passes at least one of the two strands of the chain in a chain channel, the walls of which cooperate for increasing the inertia moment the arm section in the said zone subjected to the maximal flexing moment. A part of the walls of the chain channel can thus be disposed on the other side of the chain with respect to the centre of the arm section with a supplementary body of the arm section in order to increase, considerably, the inertia of the arm section in this zone of the arm subjected to maximal forces.

The transverse section of the channel of the chain strand is surrounded by a closed annular section limiting internally the clearance of the chain strand in all the directions, and externally connected to the outline of the arm section. The closed section is advantageously extended on the side opposite the centre of the arm section by a supplementary arm section intended to increase locally the inertia of the arm section.

The closed section surrounding the transversal channel section is preferable made of the same material as the arm and substantially with the same wall thickness in order to be included in the single piece assembly of the arm.

According to another embodiment of the invention, the closed section surrounding the transverse section of the channel is dispersed protruding considerably above and/or below the main section of the arm outline, in the general form of a square or a rectangle, so as to increase considerably the inertia of the section of the outline main body in the said zone subjected to the maximal flexing moment.

According to another embodiment of the invention improving the guiding of the chain, the face of the chain channel located on the side of the main section is substantially plane and is flush with substantially plane faces provided on the adjacent part of the arm body to constitute a longitudinal guide of the backlash of the chain strand passing through the chain channel. In order to protect against wear the internal walls of the chain channel as well as the chain, the longitudinal guide of the chain strand is covered at least partially and at least at the passing through of the chain channel with a layer of a material having a good rubbing quality, such as plastic material, and this is also true, where necessary, of the other faces of the chain channel.

Other aims, advantages and features will appear from reading the description of an embodiment of the invention, given by way of non-limitative illustration and with respect to the appended drawing in which.

Figure 2:
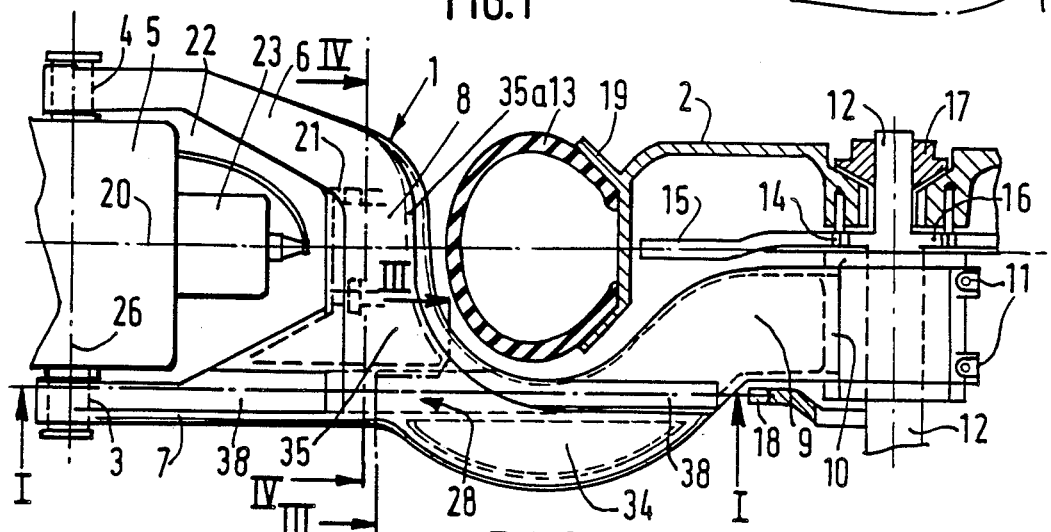
FIG. 2 is a view from above of the support arm represented at FIG. 1 accompanied by the motor in a frequency view from above and of the driving wheel in a sectioned fragmentary view.

FIG. 2 shows that the support arm 1 of the rear driving wheel 2 of a motorcycle is pivoted by bearings 3 and 4 on the chassis 5 of the motorcycle constituted, where necessary, by the motor case of the motorcycle. This pivoting is performed through the intermediary of two fork branches 6 and 7 which are connected to each other by a part of transverse arm 8 from which issues the single arm per se 9 having a resistant section in caisson and which is extended by a wheel bearing crown 10 having a large section pressing through two transverse clamps 11, of strong ball bearings, not represented, for guiding a wheel axle 12.

The wheel 2 which carries on its periphery a tire 13 is connected to the wheel axle 12 on a side of the single arm 9, for example by means of a row of screws 14 screwed in the hub of the wheel and of which the heads are intercalated between the grooves of a brake disc 15 and those of a flange 16 of the wheel axle 12. The wheel 2 is pressed by a conical head nut 17 on the flange 16 while a cogged wheel or chain sprocket wheel 18 is secured onto the axle 12, in a manner not represented, on the other side of the single arm 9.

FIG. 2 shows at its departure from the transverse part 8, the single arm 9 partially surrounding the tire 13 and the wheel-rim 19 of the wheel 2 of which the running band and the brake disc 15 are placed on the median axis 20 between the two bearings 3 and 4 and which constitutes the median axial plane of the motorcycle.

Figure 1:
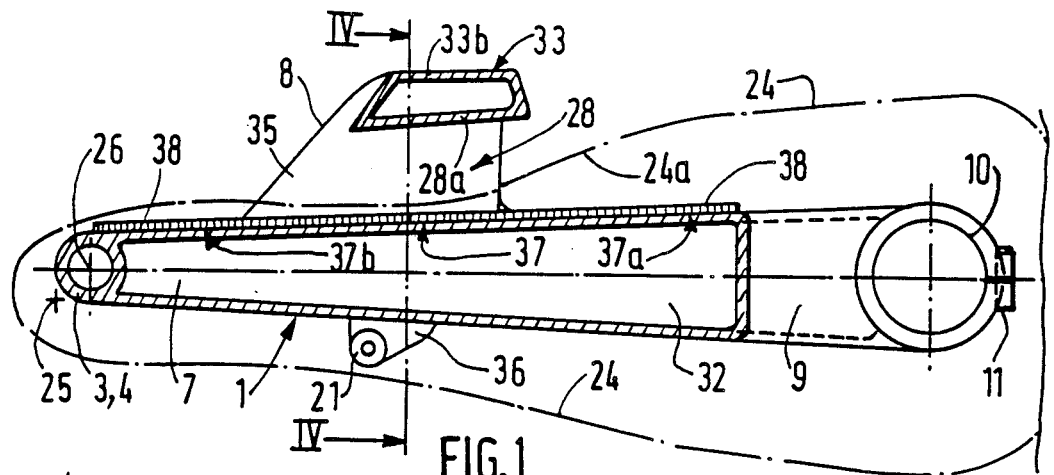
FIG. 1 is a view in longitudinal cross-section along line I—I of FIG. 2, i.e. along the chain plane, of a motorcycle driving wheel support arm according to the invention.

The suspension of the arm 1 with respect to the chassis of the motorcycle is made by the intermediary of a linking or suspension cradle not represented, and which is hooked on the lower support bearing 21 of the arm (cf. FIG. 1). During its suspension stroke or clearance, the arm 1 turns around the bearings 3 and 4 surrounding the free space 22 providing between the fork branches 6 and 7 and in which protrudes a part of the motor 5, such as a cylinder 23.

The wheel 2 is driven in rotation by an endless chain 24 of which only the median line is represented at FIG. 1 during a variation of the driving or resistant force causing the chain to whip. The chain 24 surrounding the sprocket wheel not represented, is mechanically connected to the motorcycle engine by this driving sprocket whose axis is slightly offset with respect to the axis 26 of the bearings 3 and 4 for pivoting the arm 1. The axis 25 is represented here withdrawn from the side of the motor, slightly below the axis 26, in such a manner as to supply a chain reaction to the stroke or clearance of the suspension arm 1. The receiving wheel or sprocket wheel 18 is also surrounded by the chain 24 and has here a diameter three and a half times smaller than that of the running band of the tire 13 dilated by centrifugal force, this ratio being able to reach more considerable values that lead to very great traction or retaining stresses exerted on the chain and transmitted to the single arm 9 by the wheel axle 12.

In order to resist the very high forces exerted by the chain 24 and also by the brake disc 15 during braking, these forces being transmitted to the single arm 9 through the wheel axle 12, the arm 9 must have in section, especially at its connection to the transverse arm part 8 having greater section, an important inertia or must be made of a material presenting a high resistance to the forces. The possible embodiments for the arm 1 and especially for its single arm part 9 (casting, welding, filamentary winding and coating, etc) only allow a restricted choice of relatively light and easy to work materials which all have a fairly average resistance to the forces exerted, and thus render it necessary to increase the inertia of the section of the single arm 9 presenting the general form of a box.

According to the invention, the support and suspension arm 1 presents, in the connection zone of the single arm 9 to the transverse arm part 8 and which is thus, subjected to the maximal moment of flexing a section of which the external casing 27 (cf. the cross-sections of FIGS. 3 and 4) is crossed through by at least one of the upper strands 24a or lower strands 24b of the chain 24 in a chain passage forming a chain channel 28. The walls 28a, 28b, 28c, 28d of the chain channel 28 act not only to guide the chain 24 but they are also arranged and connected to the other parts of the section of the arm 1 so as to cooperate in increasing the inertia of the section of this arm. The walls of the channel 28 constitute in section a tube having an annular section closed on itself that limits the stroke or clearance of the chain in all directions and which is externally connected to the various other walls, such as 29, 30 and 31 of the arm section.

In order to further increase the inertia of the section of the arm 1 for resisting to the flexing and torsion the tube having a closed section and surrounding the chain channel 28 is extended on the side opposite to the centre of the section of the single arm 9, i.e. on the side opposite the box 32 of the single arm 9, by a supplementary body 33 of arm section. This supplementary body 33 has for example a U-shaped section, constituted by three walls 33a, 33b and 33c which form with the wall 28a a rectangular tubular casing in the form of a box that fits on top of the chain 24 and is extended in the direction of the wheel axle 12 by a lateral box 34 for strengthening the single arm 9 in the zone laterally surrounding the tire 13 and the wheel-rim 19, and where is further developed, in addition to the torsion forces, high flexion forces.

On the side of the fork branch 6, the tubular box casing of the supplementary body 33 is extended by a transverse box 35 (cf. FIGS. 1 and 4) relatively high and with greater inertia, adapted to resist to the part of the flexing and torsion forces transmitted to the bearing 4.

Figure 3:
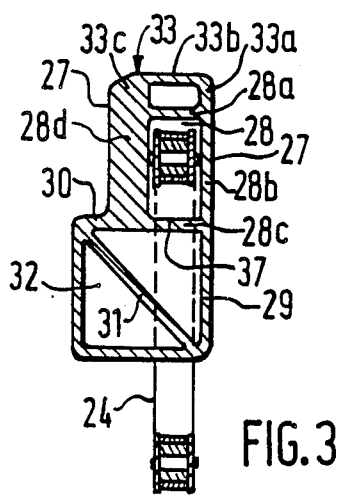
FIG. 3 is a view in cross-section along line III—III of FIG. 2, of the section of the arm in the critical zone subjected to the maximal flexion moment through which passes the driving chain.

It can be seen on the cross-section of FIG. 3 that the connections 28d and 33c of the chain channel 28 and of the casing of the box of the body 33 with the wall 35a of the box 35 (cf. FIG. 2) presents a larger section slantwise than the normal thickness of the walls of the section of the outline of the arm 1. In the embodiment represented on the figures, the arm 1 is constituted from a single piece obtained by casting, preferably in aluminum or magnesium alloy, and the walls of the chain channel 28 are made of the same material as the arm, substantially the same wall thicknesses are foreseen for all the walls, an overthickness being able to exist only in the case of slanted cross-sections of these walls or on the rounded parts of wall connections.

Figure 4:
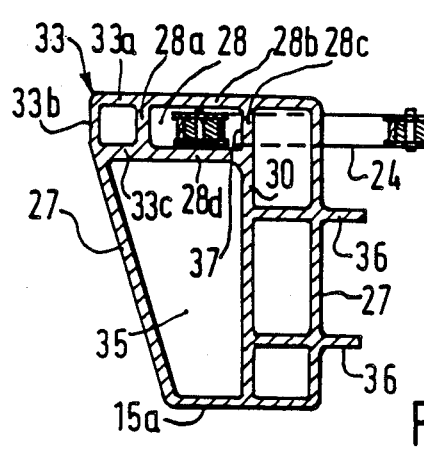
FIG. 4 is a cross-sectional view along line IV—IV of FIG. 1, on the transversal section of the arm in its part transversal to the displacement direction of the motorcycle.

The cross-sections represented on FIGS. 3 and 4 render apparent the sections of the different intermediary parts 6, 7, 8, 9, of the arm 1 which all have a box structure. In the single arm 9, the caisson 32 has a substantially square cross-section, with a transverse strengthening wall 31. The boxes 34 and 35 as well as the tube having an annular section 28a, 28b, 28c, 28d which surrounds the chain channel 28 protrudes considerably above the boxes and thus considerably increases the inertia for resisting to the flexing or to the torsion of the section of the box 32 of the main body of the single arm 9. The transverse arm part 8 has in transverse cross-section (according to the cross-section represented on FIG. 4) a general trapezoidal or rectangular truncated form which is further strengthened by ribs 36 for supporting the lower suspension bearings 21.

The lower face 37 of the chain channel 28 is substantially plane in the axial direction of the chain and it is extended and connected, at the outlet of the channel channel, as can be seen on FIG. 1, by substantially plane faces 37a and 37b provided in the upper outer part of the box 32 constituting the web of the single arm 9 extended towards the bearing 3 by the fork branch 7. These plane parts 37, 37a and 37b can thus constitute a low chain guide when the upper strand 24a of the chain beats down, during an inversion of engine torque for example, and such as represented in FIG. 1. To prevent the deterioration of the surfaces 37, 37a and 37b as well as of the chain 24 after prolongated use of the motorcycle, these surfaces are coated at least partially or from place to place with plastic material plates 38 having a low rubbing coefficient and good resistance to abrasion. Such wear and rubbing plates can be also applied to the other internal faces of the chain channel 28 in order to cope with a clearance or a lateral or towards the top derivation of the chain 24 the tension of which can be adjusted by rotation of an eccentric provided either on the axis 26 of the bearings 3, 4 or inside the wheel bearing crown 10.

The working of the support arm 1 which has just been described will become evident from figures. In function of the charge transmitted by the chassis 5 of the motorcycle, the arm 1 turns more or less around the bearings 3 and 4 by allowing these latter to be lowered in the case of overload and by compressing a suspension spring generally combined to a shock absorber. The chain 24 is in an open state through the chain channel 28 and around the driven sprocket 18 and receiving sprockets then is closed on itself by crimping or stapling of the last links. Its tension is adjusted by rotation of the bearing or wheel eccentrics.

The traction forces exerted by the upper strand 24a of the chain during driving of the motorcycle or exerted by the lower strand 24b during braking with the engine brake, are transmitted from the receiving sprocket wheel 18 to the wheel axle 12 and from there to the bearing crown 10 at the end of the single arm 9. These very considerable forces which can reach more than ten times the normal force exerted on the wheel 2 provoke on the single arm 9 a series of complex forces:

a torsion of the box 32;

eccentric flexion of the box 32;

eccentric axial compression of the box introducing buckling.

If for a section of the caisson remaining constant, the torsion forces remain constant, this is not true of the flexing forces which increase progressively as the overhang of the single arm 9 increases (cantilever mounting). The increase of flexing forces is prevented by the progressive development of the lateral box 34 then of the walls surrounding the chain channel 28 up to the transfer of the flexing, torsion and compression forces on the two fork branches 6 and 7 via the wall strengthening around the chain channel 28 and the transverse arm part 8 with armatures and lower ribs represented in cross-section on FIG. 4.

The arm according to the invention, while being very light weight, proves to have extraordinary resistance to the multiple forces exerted thereupon, due to the high inertia for resistance to flexing and to torsion that it presents according to the various sections. Furthermore, the arm ensures in service excellent protection of the chain against agressions (projections) during running without imparting its accessibility for inspection or control purposes, especially relating to the chain tension.

It is well understood that the present invention is in no way limited to the embodiments described and represented herein-above but is adaptable to numerous alternatives available to those skilled in the art without departing from the spirit and scope of the invention, specially when the arm is made by total or partial welding or by winding or intercrossing of fibers.

I claim:

1. Support and suspension arm for a driving wheel of a vehicle having a frame, the wheel mounted on one side of the arm and connected at least in rotation on the other side of the arm to a driving endless chain, the said arm being pivoted on the frame of the vehicle by an arm part which is disposed transversely to the moving direction of the vehicle, and is connected by at least two rotary bearings to the vehicle frame, wherein said arm has a region where it is subjected to a large flexion moment beyond the connection with an arm part thereof that is disposed transversely with respect to the frame of the vehicle, and said arm has, in said region, an outer casing of the arm cross-section through which crosses at least one of the two strands of the chain in a chain channel, the walls of which cooperate for increasing the inertia moment of the arm section in the said region.

2. Support arm according to claim 1, wherein the tranverse section of the channel of the chain strand channel is surrounded by a closed annular section limiting internally the clearance of the chain strand in all directions and externally connected to the outline of the arm section.

3. Support arm according to claim 2, wherein the closed annular section is extended, on the side opposite the centre of the section of the arm by a supplementary arm section intended to increase locally the inertia moment of the arm section.

4. Arm support according to claim 2, wherein the closed section surround the transverse section of the chain channel is made of the same material as the arm and substantially with the same thickness wall as said arm, in order to be included in the single piece assembly of the arm.

5. Arm support according to claim 2, wherein the closed section surround the transverse section of the chain channel is disposed protruding considerably above or below the arm outline main section in a generally quadrangular, in such a way as to increase significantly the inertia moment of the section of the main outline body in the said region subjected to the large flexion moment.

6. Support arm according to claim 1, wherein the face of the chain channel located on the side of the main section is substantially plane and is flush with substantially plane faces, provided on the part adjacent to the arm body, in order to constitute a longitudinal guide of the chain strand passing through the chain channel.

7. Support arm according to claim 6, wherein the longitudinal guide of the chain strand is covered at least partially and at least at the passage through the chain channel with a layer of a material having a low friction, such as plastic material.

8. Support arm according to claim 1, wherein the faces of the chain channel are covered at least partially with a material having a low friction, such as plastic material.

* * * * *